US012639113B2

(12) United States Patent
Latkar

(10) Patent No.: US 12,639,113 B2
(45) Date of Patent: May 26, 2026

(54) OPTIMIZATION ENGINE FOR DYNAMIC RESOURCE PROVISIONING

(71) Applicant: Bank of America Corporation, Charlotte, NC (US)

(72) Inventor: Sachin Mahalasakant Latkar, North Brunsick, NJ (US)

(73) Assignee: Bank of America Corporation, Charlotte, NC (US)

( * ) Notice: Subject to any disclaimer, the term of this patent is extended or adjusted under 35 U.S.C. 154(b) by 793 days.

(21) Appl. No.: 17/514,414

(22) Filed: Oct. 29, 2021

(65) Prior Publication Data

US 2023/0139459 A1      May 4, 2023

(51) Int. Cl.
| | |
|---|---|
| *G06F 9/46* | (2006.01) |
| *G06F 9/50* | (2006.01) |
| *G06N 20/00* | (2019.01) |
| *G06Q 10/0631* | (2023.01) |
| *G06Q 40/02* | (2023.01) |
| *H04L 65/00* | (2022.01) |

(52) U.S. Cl.
CPC ............ *G06F 9/5011* (2013.01); *G06F 9/468* (2013.01); *G06N 20/00* (2019.01); *G06Q 10/06311* (2013.01); *G06Q 40/02* (2013.01); *H04L 65/00* (2013.01); *G06F 2209/503* (2013.01)

(58) Field of Classification Search
CPC .. G06F 9/5011; G06F 9/468; G06F 2209/503; G06F 9/5055; G06N 20/00; G06Q 10/06311; G06Q 40/02; H04L 65/00
See application file for complete search history.

(56) References Cited

U.S. PATENT DOCUMENTS

| | | | |
|---|---|---|---|
| 7,039,654 B1 | 5/2006 | Eder | |
| 9,513,627 B1 | 12/2016 | Elazary et al. | |
| 9,529,634 B1 * | 12/2016 | Hsu | G06F 9/468 |
| 9,600,340 B1 * | 3/2017 | Mundar | G06F 9/5005 |
| 10,872,160 B2 | 12/2020 | AthuluruTlrumala | |
| 10,884,598 B2 | 1/2021 | Bhatt et al. | |

(Continued)

OTHER PUBLICATIONS

"IEEE Recommended Practice for Implementation and Management Methodology for Software-Based Intelligent Process Automation," in IEEE Std 2755.Feb. 2020 , vol. No., pp. 1-59, Apr. 14, 2021 (Year: 2021).*

*Primary Examiner* — Crystol Stewart
(74) *Attorney, Agent, or Firm* — Banner & Witcoff, Ltd.

(57) ABSTRACT

Arrangements for resource optimization and control are provided. In some aspects, one or more work process requests may be received. The work process requests may be aggregated to identify a current book of work. In some examples, availability data from a variety of sources, such as bots, resource operators, and the like, may be received. In some aspects, license data associated with the one or more bot resources may be retrieved. A machine learning engine may be executed to determine an optimal number of resources, type of resources, and the like, to process the book of work. Based on the determination, one or more instructions may be generated. For instance, instructions to provision one or more bots may be generated, instructions assigning work processes to one or more resource operators may be generated, and the like. The generated instructions may be transmitted to a resource for execution.

15 Claims, 12 Drawing Sheets

(56)        References Cited

U.S. PATENT DOCUMENTS

| | | | |
|---|---|---|---|
| 11,444,893 B1* | 9/2022 | Kalluri | ................... G10L 15/22 |
| 2015/0235143 A1 | 8/2015 | Eder | |
| 2016/0196587 A1 | 7/2016 | Eder | |
| 2017/0289069 A1* | 10/2017 | Plumb | ...................... G06F 9/46 |
| 2020/0147791 A1* | 5/2020 | Safary | ................... G06N 20/00 |
| 2020/0364083 A1* | 11/2020 | Walby | ................. G06F 9/5072 |
| 2022/0116485 A1* | 4/2022 | Gandhi | ................ H04L 51/216 |
| 2022/0263946 A1* | 8/2022 | Grebovic | ........... H04M 3/5233 |
| 2022/0300336 A1* | 9/2022 | Major | .................... G06F 9/546 |
| 2022/0335223 A1* | 10/2022 | Tripathi | ................ G06F 40/35 |
| 2022/0360669 A1* | 11/2022 | Munoz | .............. H04M 3/5238 |
| 2022/0382580 A1* | 12/2022 | Frank | ............... G06Q 10/0631 |
| 2023/0056439 A1* | 2/2023 | Dimble | ............... G06F 21/602 |

* cited by examiner

110

111

112

Resource Optimization And Control Computing Platform

Processor(s)

Memory(s)

Historical/Training Data Module
112a

Machine Learning Engine
112b

Work Process Module
112c

Resource Availability Data Module
112d

License Module
112e

Resource Output and Control Module
112f

113

Communication Interface(s)

| Sub Process | Human | RPA BOT | RDA BOT along with Human | Optimal |
|---|---|---|---|---|
| Get break resolution details from customer email | Y (3 min) | Y (1 min)* | Y (2 min) | RPA BOT (Independent) |
| Assignment of break-resolution | Y (3 min) | Y (2 min) | Y (1 min)* | RDA with Human |
| Break resolution (Rule Based) | Y (7 min) | Y (4 min)* | | RPA BOT (Independent) |
| Exception process (10%) | Y (9 min)* | N | N | Human |
| Consolidation | Y (3 min) | Y (1 min)* | Y (2 min) | RPA BOT (Independent) |

FIG. 3

OPTIMIZATION ENGINE FOR DYNAMIC RESOURCE PROVISIONING

BACKGROUND

Aspects of the disclosure relate to electrical computers, systems, and devices for dynamically determining and provisioning optimal resources for work process handling.

Enterprise organizations often employ hundreds or possibly thousands of employees to handling various processing functions. In addition, enterprise organizations often utilize bots, such as robotic process automation bots, robotic desktop automation bots, and the like, to assist the employee workforce in processing the requests. This is particularly important in large organizations that may process hundreds or thousands of requests in a time period. However, ensuring that a hybrid workforce is used efficiently can be difficult and inaccurate. Accordingly, aspects described herein provide for dynamic resource provisioning based on optimized resource distribution.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with identifying optimal resources for processing requests and dynamically provisioning the identified resources.

In some aspects, one or more work process requests may be received. In some arrangements, the work process requests may be aggregated or compiled to identify a current book of work.

In some examples, availability data from a variety of resources may be received. For instance, availability from one or more resource operator computing devices may be received. Additionally or alternatively, availability of one or more bot resources may be received. In some aspects, license data associated with the one or more bot resources may be retrieved.

In some aspects, a machine learning engine may be executed to determine an optimal number of resources, type of resources, and the like, to process the book of work. In some examples, the book of work, availability data, and license data may be used as inputs to the machine learning engine.

Based on the determination, one or more instructions or commands may be generated. For instance, instructions to provision one or more bots may be generated, instructions assigning work processes to one or more resource operators may be generated, and the like. The generated instructions may be transmitted to a bot control server, resource operator computing device, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 illustrates one example dataset identifying optimal resource types for various work processes in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, hybrid workforce arrangements in which bot resources are used to supplement employee resources are becoming increasingly common in enterprise organizations. However, it can be difficult to identify necessary resources and quickly provision the necessary resources.

Accordingly, arrangements described herein provide for using machine learning to identify an optimal number and type of resources to address a current book of work and dynamically provision the identified resources to meet the current need. In some examples, one or more machine learning models may be trained using historical data related to previously processed work processes, resources used in the processing, time of processing and the like. The training data may be used to identify resources to process a baseline book of work.

In some examples, work process requests may be received and aggregated to identify a book of work representing current requests. Availability data associated with resources, such as employee resources, bot resources, and the like, may be received. In some examples, license data associated with licenses for one or more bot resources may be received. This data may be used as inputs into the machine learning model and the model may be executed to identify a number and type of resources to process the current book of work.

Based on the determination, one or more bots may be provisioned, privileges requested, and the like, to facilitate assignment of the work processes to the various resources. Based on the assigned work processes, feedback data may be received and used to update and/or validate the one or more machine learning models.

These and various other arrangements will be discussed more fully below.

Figure 1A:
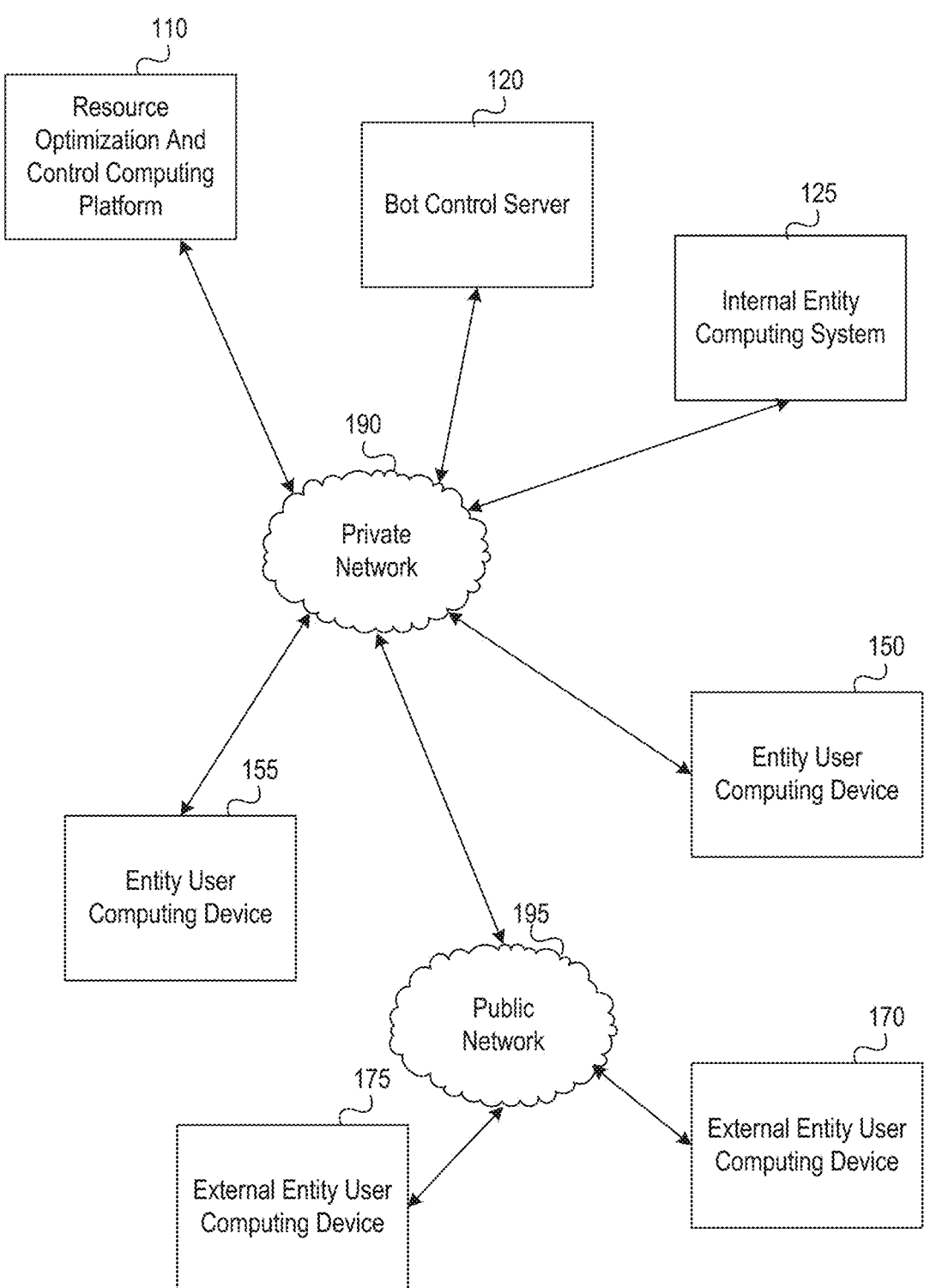
FIGS. 1A and 1B depict an illustrative computing environment for implementing resource optimization and control functions in accordance with one or more aspects described herein.
Figure 1B:
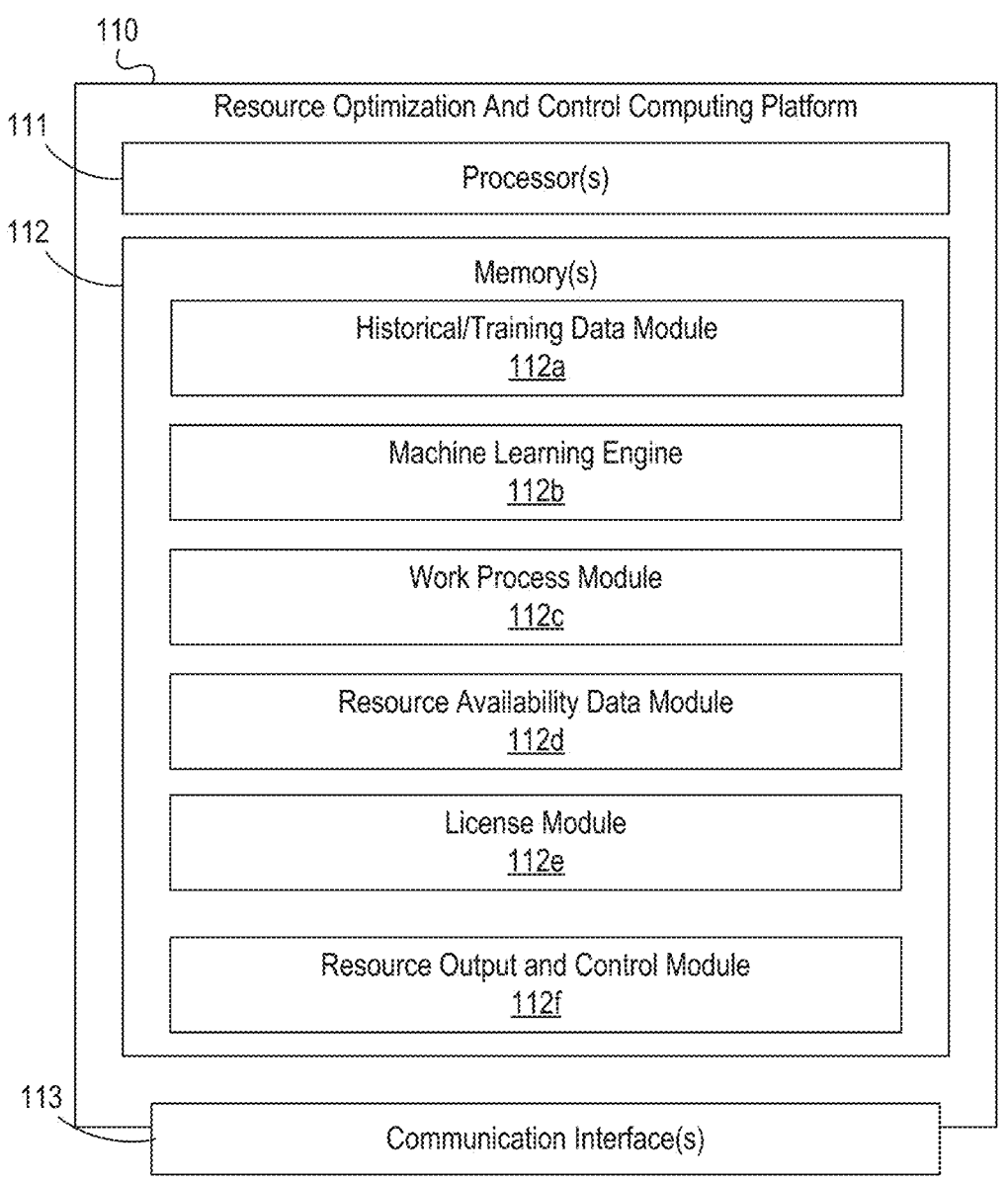

FIGS. 1A-1B depict an illustrative computing environment for implementing and using resource optimization and control functions in accordance with one or more aspects described herein. Referring to FIG. 1A, computing environment 100 may include one or more computing devices and/or other computing systems. For example, computing environment 100 may include resource optimization and control computing platform 110, bot control server 120, internal entity computing system 125, entity user computing device 150, entity user computing device 155, external entity user computing device 170 and external entity user computing device 175. Although one internal entity computing systems 120, one bot control server 120, two entity user computing devices 150, 155, and two external entity user computing devices 170, 175, are shown, any number of systems or devices may be used without departing from the invention.

Resource optimization and control computing platform 110 may be configured to provide intelligent, dynamic evaluation resources and a current book of work and identify an appropriate number of resources to provision and assign resources in an optimized manner. For instance, resource optimization and control computing platform 110 may include one or more machine learning models trained using historical request and processing data to determine an optimized number of resources, both human resources and bot resources, provision necessary resources, and the like.

In some examples, the training data may include previously received requests for service or work processes (e.g., request for a loan, request for customer service, request for processes associated with a line of business, and the like). Further, the training data may include an indication of what type of resource handled the previous request (e.g., bot, human or hybrid bot/human), an outcome of the request (e.g., was it resolved, was the customer satisfied, or the like), and/or any additional information. This information may be used to build and train a machine learning model that may be used to identify a best resource to handle an outstanding request for service. In some examples, that model may be used to determine an optimized number of each type of resource (e.g., bot or human, robotic process automation bot or robotic desktop automation bot, and the like) based on an expected or projected book of work (e.g., projected or expected number and type of requests for service based on historical data).

In some examples, outputs from the machine learning model may be used as inputs in another machine learning model configured to optimize resources, identify a number of resources desired based on a current (e.g., real-time) book of work, and the like. In some examples, a single machine learning model may be while in other examples, two or more machine learning models may be used.

The resource optimization and control computing platform 110 may input the real-time book of work, as well as availability data received from one or more entity user computing devices (e.g., activity logs, cursor movement data, or the like), bot availability data, license data associated with bots, and the like, into the machine learning model to determine a suggested workforce to handle or process the current book of work. For instance, the machine learning model may determine a number of bots to provision, types of bots to provision, a number of human users or resource operators needed to address the book of work, and the like.

In some examples, the machine learning model may be trained using operational excellence data that may indicate a base number of bots, types of bots, human users, and the like, to address a baseline book of work (e.g., a book of work projected or expected based on historical data). In some examples, training the machine learning model may include identifying, for each group within an enterprise organization, such as a line of business, a plurality of processes. Further, a sub-unit within the line of business and associated processes may then be determined. Within the sub-unit, one or more sub processes of each process may be identified and evaluated. For each sub process, historical data may be retrieved indicating an expected amount of time to process the sub process (e.g., request for service) by each different available resource (e.g., human, robotic process automation (RPA) bot, remote desktop automation (RDA) bot/human hybrid). For example, as shown in FIG. 3, one process within the sub-unit may include break resolution. Break resolution may include 5 sub processes: 1) Get break resolution details from customer email; 2) Assignment of break resolution; 3) Break resolution (rule based); 4) Exception process (e.g., an exception that requires human processing and cannot be processed by a bot); 5) Consolidation.

Based on the historical data, an optimal processing resource may be identified. For instance, as shown in FIG. 3, an amount of time to process each sub process by each different type of resource is shown. For instance, assignment of break resolution may take 3 minutes for a human, 2 minutes for an RPA bot or 1 minute for an RDA bot/human hybrid. Accordingly, for the subprocess "assignment of break resolution" the RDA bot/human hybrid resource would be the optimal resource for processing that type of request for service. A shown in FIG. 3, the optimal resources is identified by an asterisk next to the resource having the fastest processing time. This analysis may be completed for each sub process for each process within a sub-unit for each line of business or group within the enterprise organization. The optimal number of resources to handle a baseline book of work may then be determined by summing a total number of each resource type for each sub process within a process. For instance, continuing with the example shown in FIG. 3, an optimal number of resources to process a baseline book of work for the sub process "break resolution" would include one human user, 3 RPA bots and 1 RDA bot/human hybrid.

The trained machine learning model and then receive, as inputs, the optimal resources to handle the baseline book of work, real-time availability data, license data and a current book of work (e.g., requests for service or work processes received) and may determine a suggested resource workforce or distribution to handle the current book of work.

Computing environment 100 may further include a bot control server 120. The bot control server 120 may control bots for use in request processing, provision bots based on credentials needed for processing requests in a particular line of business, or the like.

Internal entity computing system 125 may include one or more computing devices or systems associated with the entity or enterprise organization implementing the resource optimization and control computing platform 110. Internal entity computing system 125 may have or include one or more databases, file storage systems, may host or execute one or more applications, and the like, used for execution of the business of the entity or enterprise organization. For instance, in some examples, internal entity computing system 125 may receive and store data associated with previously processed requests for service, type of resource that handled the request, and the like. In some examples, internal entity computing system 125 may store data related to licenses for one or more RPA bots, RDA bots, and the like. Further, internal entity computing system 125 may, in some examples, receive requests for service or otherwise compile the book of work to be processed by the resources identified via the resource optimization and control computing platform 110.

Entity user computing device 150 and/or entity user computing device 155 may be one or more computing devices associated with the enterprise organization. For instance, entity user computing device 150 may be a computing device accessed by one or more users (e.g., employees of the enterprise organization) in the course of business and may be used to receive and address customer requests, request work processes, and the like. In some examples, one or more of entity user computing device 150 and/or entity user computing device 155 may be computing devices operated by a customer service representative of the enterprise organization and configured to receive user input including requests from one or more users received via various channels (e.g., in person, over the telephone, or the like). In some examples, entity user computing device 150 and/or entity user computing device 155 may be configured to receive outputs from one or more bots, display the outputs receive user input, and the like.

Entity user computing device 150 and/or entity user computing device 155 may, in some examples, be user computing devices associated with human users (e.g., resource operators) processing one or more work process or service request. For instance, entity user computing device 150 and/or entity user computing device 155 may be associated with users or resource operators who may address requests and for whom availability data may be used to determine current or real-time availability. In some examples, activity logs, cursor movement data, or the like, from one or more of entity user computing device 150 and/or entity user computing device 155 may be transmitted to resource optimization and control computing platform 110 for determination of resource availability.

External entity user computing device 170 and/or external entity user computing device 175 may be a user computing device, such as a desktop computer, laptop computer, tablet, smartphone, wearable device, or the like, associated with one or more users, customers or potential customers of the enterprise organization. In some examples, users may input a request for service to external entity user computing device 170 and/or external entity user computing device 175, which may then be conveyed to the resource optimization and control computing platform 110 for evaluation and processing.

Computing environment 100 also may include one or more computing platforms. For example, and as noted above, computing environment 100 may include resource optimization and control computing platform 110. As illustrated in greater detail below, resource optimization and control computing platform 110 may include one or more computing devices configured to perform one or more of the functions described herein. For example, resource optimization and control computing platform 110 may include one or more computers (e.g., laptop computers, desktop computers, servers, server blades, or the like).

As mentioned above, computing environment 100 also may include one or more networks, which may interconnect one or more of resource optimization and control computing platform 110, bot control server 120, internal entity computing system 125, entity user computing device 150, entity user computing device 155, external entity user computing device 170, and/or external entity user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, resource optimization and control computing platform 110, bot control server 120, internal entity computing system 125, entity user computing device 150 and entity user computing device 155, may be associated with an enterprise organization (e.g., a financial institution), and private network 190 may be associated with and/or operated by the organization, and may include one or more networks (e.g., LANs, WANs, virtual private networks (VPNs), or the like) that interconnect resource optimization and control computing platform 110, bot control server 120, internal entity computing system 125, entity user computing device 150, entity user computing device 155, and one or more other computing devices and/or computer systems that are used by, operated by, and/or otherwise associated with the organization. Public network 195 may connect private network 190 and/or one or more computing devices connected thereto (e.g., resource optimization and control computing platform 110, bot control server 120, internal entity computing system 125, entity user computing device 150, entity user computing device 155,) with one or more networks and/or computing devices that are not associated with the organization. For example, external entity user computing device 170, and/or external entity user computing device 175, might not be associated with an organization that operates private network 190 (e.g., because external entity user computing device 170 and/or external entity user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity user computing device 170 and/or external entity user computing device 175 to private network 190 and/or one or more computing devices connected thereto (e.g., resource optimization and control computing platform 110, bot control server 120, internal entity computing system 125, entity user computing device 150, entity user computing device 155).

Referring to FIG. 1B, resource optimization and control computing platform 110 may include one or more processors 111, memory 112, and communication interface 113. A data bus may interconnect processor(s) 111, memory 112, and communication interface 113. Communication interface 113 may be a network interface configured to support communication between resource optimization and control computing platform 110 and one or more networks (e.g., private network 190, public network, or the like). Memory 112 may include one or more program modules having instructions that when executed by processor(s) 111 cause resource optimization and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of resource optimization and control computing platform 110 and/or by different computing devices that may form and/or otherwise make up resource optimization and control computing platform 110.

For example, memory 112 may have, store and/or include historical/training data module 112*a*. Historical/training data module 112*a* may store instructions and/or data that may cause or enable the resource optimization and control computing platform 110 to retrieve historical and/or training data from one or more systems or devices, such as internal entity computing system 125. The historical and/or training data may include data related to previously processed requests, types of resources used to process previous requests, and the like. In some examples, the historical and/or training data may include data associated with a time to process a particular request (e.g., time to process a particular subprocess) for each type of resource (e.g., RPA bot, human, RDA bot/human hybrid). This data may then be used to determine an optimal resource to handle a particular request and determine the number of the resource needed based on the number of requests.

Resource optimization and control computing platform 110 may further have, store and/or include machine learning engine 112*b*. Machine learning engine 112*b* may store instructions and/or data to generate, training, execute and validate and/or update one or more machine learning models. Various machine learning algorithms may be used (e.g., by the machine learning engine 112*b*) without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, machine learning engine 112*b* may generate, train, execute, and validate and/or update more than one machine learning model, such as a first machine learning model for determining resources needed based on historical data and a second machine learning model to determine a number of resources of each type needed based on a current or real-time need (e.g., book of work, current availability, license information, and the like). In some examples, a single machine learning model may be used to make the determinations described herein.

Resource optimization and control computing platform 110 may further have, store and/or include work process module 112*c*. Work process module 112*c* may store instructions and/or data that may cause or enable the resource optimization and control computing platform 110 to receive requests for service, such as work process requests, identify a type of request, and the like. In some examples, work process module 112*c* may compile or aggregate requests for service or work process requests in order to determine a current book of work (e.g., outstanding requests that need to be processed by a resource). The data may be received from one or more sources (e.g., internal sources, external sources) and may be received in real-time or near real-time to provide a current book of work for processing.

Resource optimization and control computing platform 110 may further have, store and/or include resource availability data module 112*d*. Resource availability data module 112*d* may store instructions and/or data that may cause or enable the resource optimization and control computing platform 110 to receive data from a plurality of resources (e.g., bot control server 120, entity user computing device

150, and the like) to determine availability of one or more resources. For instance, bot availability data (e.g., whether a bot is engaged or idle) may be received for a plurality of bots (e.g., RPA bots, RDA bots, and the like). Additionally or alternatively, human user availability data may be received from one or more entity user computing devices, such as entity user computing device 150, entity user computing device 155, or the like. The human user availability data may include activity logs from the devices, cursor movement data from the devices, and the like. In some examples, availability data from human users and bots may be received in real-time or near real-time to provide an accurate indication of availability.

Resource optimization and control computing platform 110 may further have, store and/or include license module 112*e*. License module 112*e* may store instructions and/or data that may cause or enable the resource optimization and control computing platform 110 to retrieve from one or more computing devices or systems (e.g., internal entity computing system 125) license data for each bot (e.g., RPA bots, RDA bots). The license data may then be used to determine availability of bots, evaluate costs associated with using bots, and the like. In some examples, the license data may be used as an input into a machine learning model to identify a number of resources needed.

Resource optimization and control computing platform 110 may further have, store and/or include resource output and control module 112*f*. Resource output and control module 112*f* may store instructions and/or data that may cause or enable the resource optimization and control computing platform 110 to generate a notification including one or more outputs from the machine learning model(s) (e.g., indicating a number of each type of resource to provision). The notification may be transmitted to one or more user computing devices. Resource output and control module 112*f* may also include instruction and/or data configured to cause or enable resource optimization and control computing platform 110 to transmit one or more instructions or commands to bot control server 120 to commission a particular number of bots, a number of certain types of bots and the like. In some examples, the provisioning instructions may further include automatically requesting bot privileges for a particular line or business for which the bot will be provisioned, and the like. In some arrangements, resource output and control module 112*f* may transmit requests for service or work processes to resources identified by the system (e.g., if the current book of work includes processes to assign to a human operator those tasks may be pushed to user devices associated with the operators for processing, and the like). In another example, tasks eligible for bot processing may be transmitted to the bot control server 120 for assignment to a provisioned by and processing.

FIGS. 2A-2G depict one example illustrative event sequence for executing resource optimization and control functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
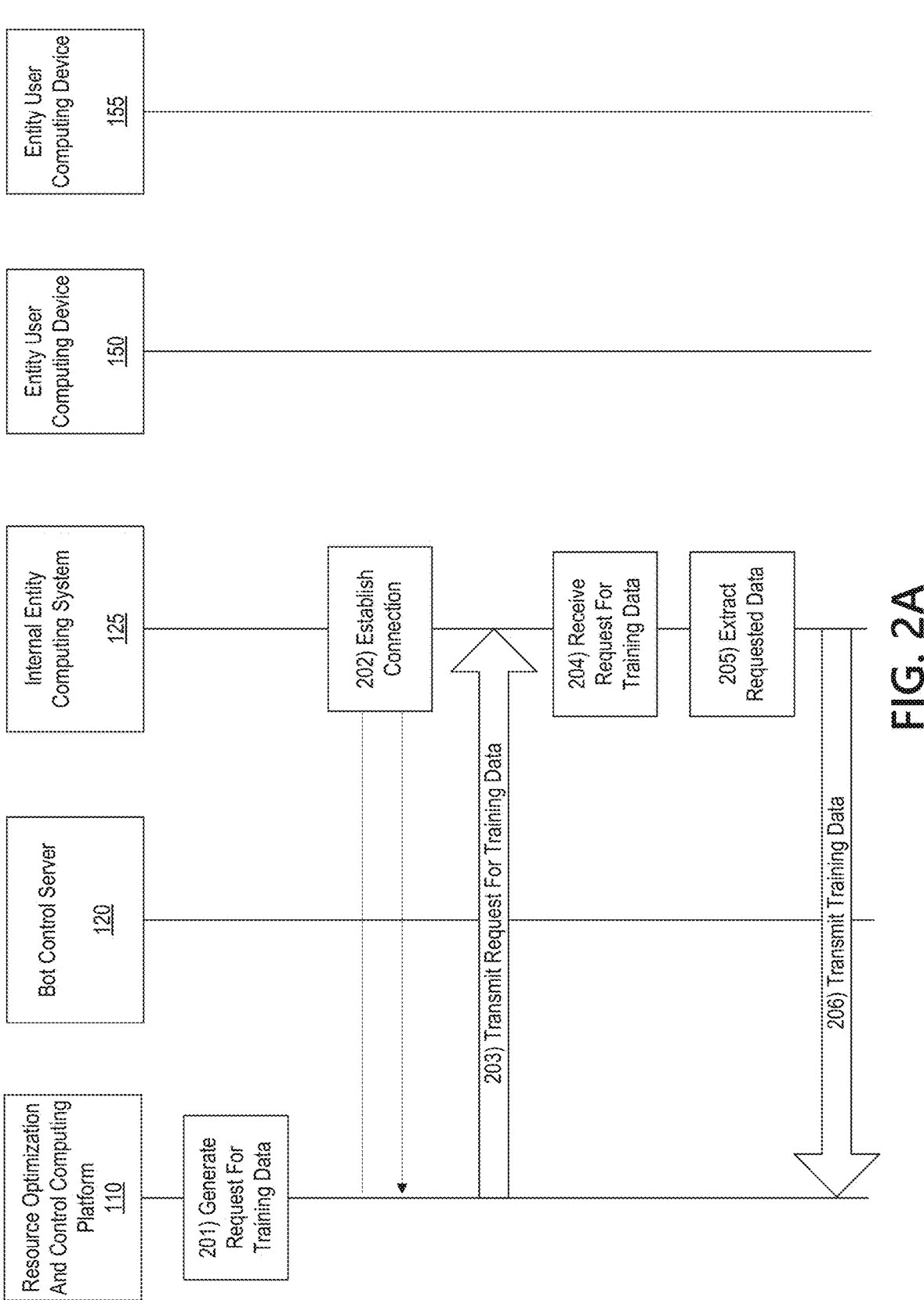
FIGS. 2A-2G depict an illustrative event sequence for implementing resource optimization and control functions in accordance with one or more aspects described herein.

Referring to FIG. 2A, at step 201, the resource optimization and control computing platform 110 may generate a request for historical and/or training data. For instance, a request for data to be used in training one or more machine learning models may be generated. In some examples, the training and/or historical data may include previous processed work processes or requests for service, type of resource used to process previous requests, time to process previous requests, and the like.

At step 202, a connection may be established between the resource optimization and control computing platform 110 and internal entity computing system 125. For instance, a first wireless connection may be established between the resource optimization and control computing platform 110 and internal entity computing system 125. Upon establishing the first wireless connection, a communication session may be initiated between resource optimization and control computing platform 110 and internal entity computing system 125.

At step 203, the request for training and/or historical data may be transmitted to the internal entity computing system 125. For instance, resource optimization and control computing platform 110 may transmit the request during the communication session initiated upon establishing the first wireless connection.

At step 204, the internal entity computing system 125 may receive the request for historical and/or training data and may process the request. At step 205, the internal entity computing system 125 may extract the requested data. In some examples, the data may be requested for a particular time period, a particular line of business or the like. Extracting the data may include identifying any parameters associated with the request and extracting the requested data based on the parameters.

At step 205, the extracted training and/or historical data may be transmitted to the resource optimization and control computing platform 110. For instance, the internal entity computing system 125 may transmit the extracted data during the communication session initiated upon establishing the first wireless connection. Alternatively, a new connection may be established.

Figure 2B:
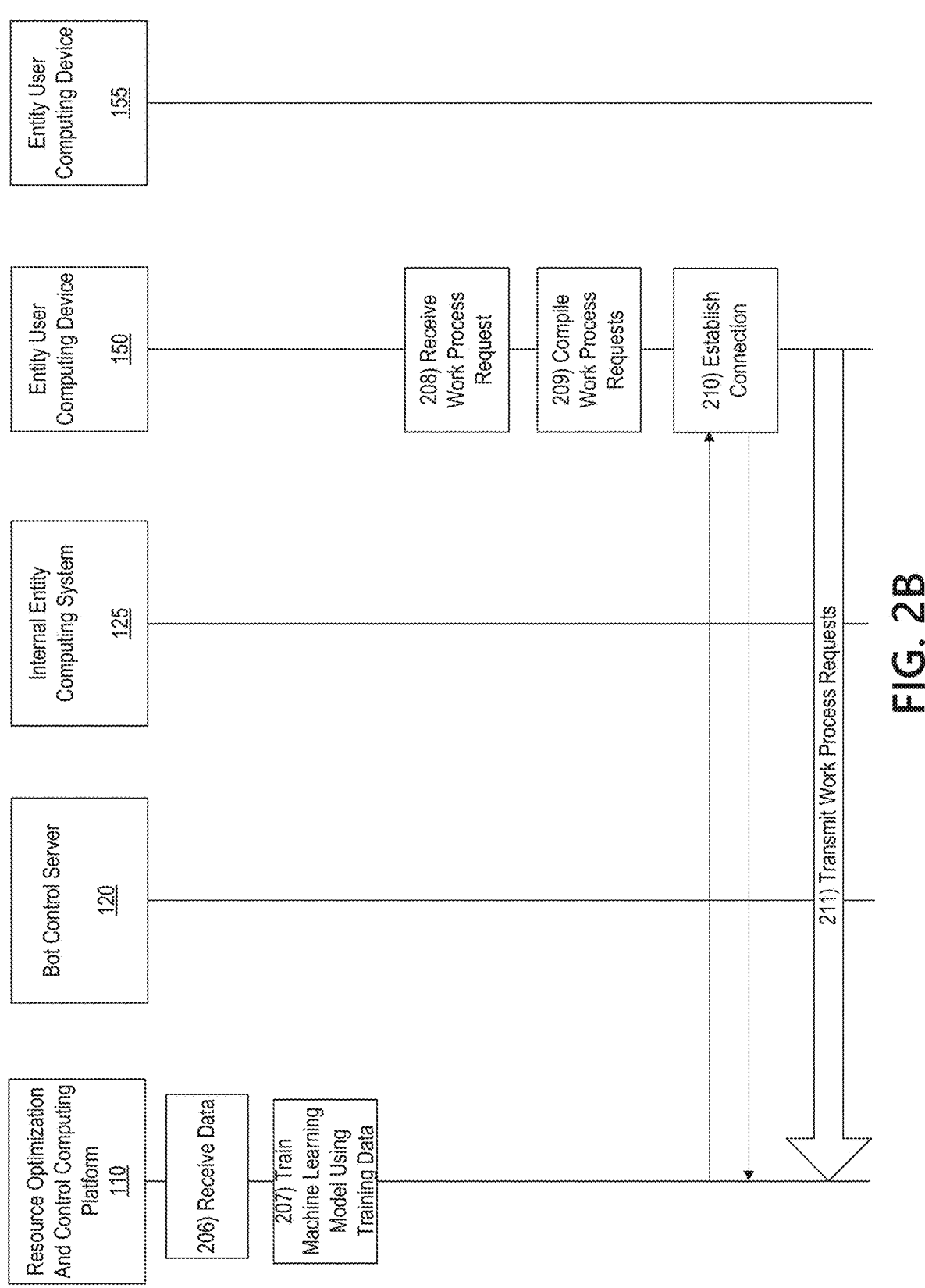

With reference to FIG. 2B, at step 206, the extracted training and/or historical data may be received by the resource optimization and control computing platform 110 and, at step 207, may be used to train one or more machine learning models. For instance, as discussed here, one or more machine learning models may be trained using historical data to identify patterns or sequences in data that may link a particular type of process to a type of resource for process, a number of work processes processed to a number of resources, and the like. Accordingly, the resource optimization and control computing platform 110 may generate, train, execute and/or update the one or more machine learning models to predict an optimal resource for a type of work process requested, a desired number of each type of resource to process a current or real-time book of work, and the like.

At step 208, a request for a work process may be received. For instance, a user computing device, such as entity user computing device 150, may receive a request for a work process. In some examples, work processes may include various functions within a line of business, requests for service, and the like.

At step 209, the receive work process request may be compiled or aggregated with any other received work process requests.

At step 210, a connection may be established between the entity user computing device 150 and resource optimization and control computing platform 110. For instance, a second wireless connection may be established between the resource optimization and control computing platform 110 and entity user computing device 150. Upon establishing the second wireless connection, a communication session may be initiated between resource optimization and control computing platform 110 and entity user computing device 150.

At step 211, the entity user computing device 150 may transmit the work process request and/or compiled or aggregated work process requests to the resource optimization and control computing platform 110. For instance, the entity user computing device 150 may transmit the work process requests during the communication session initiated upon establishing the second wireless connection.

Figure 2C:
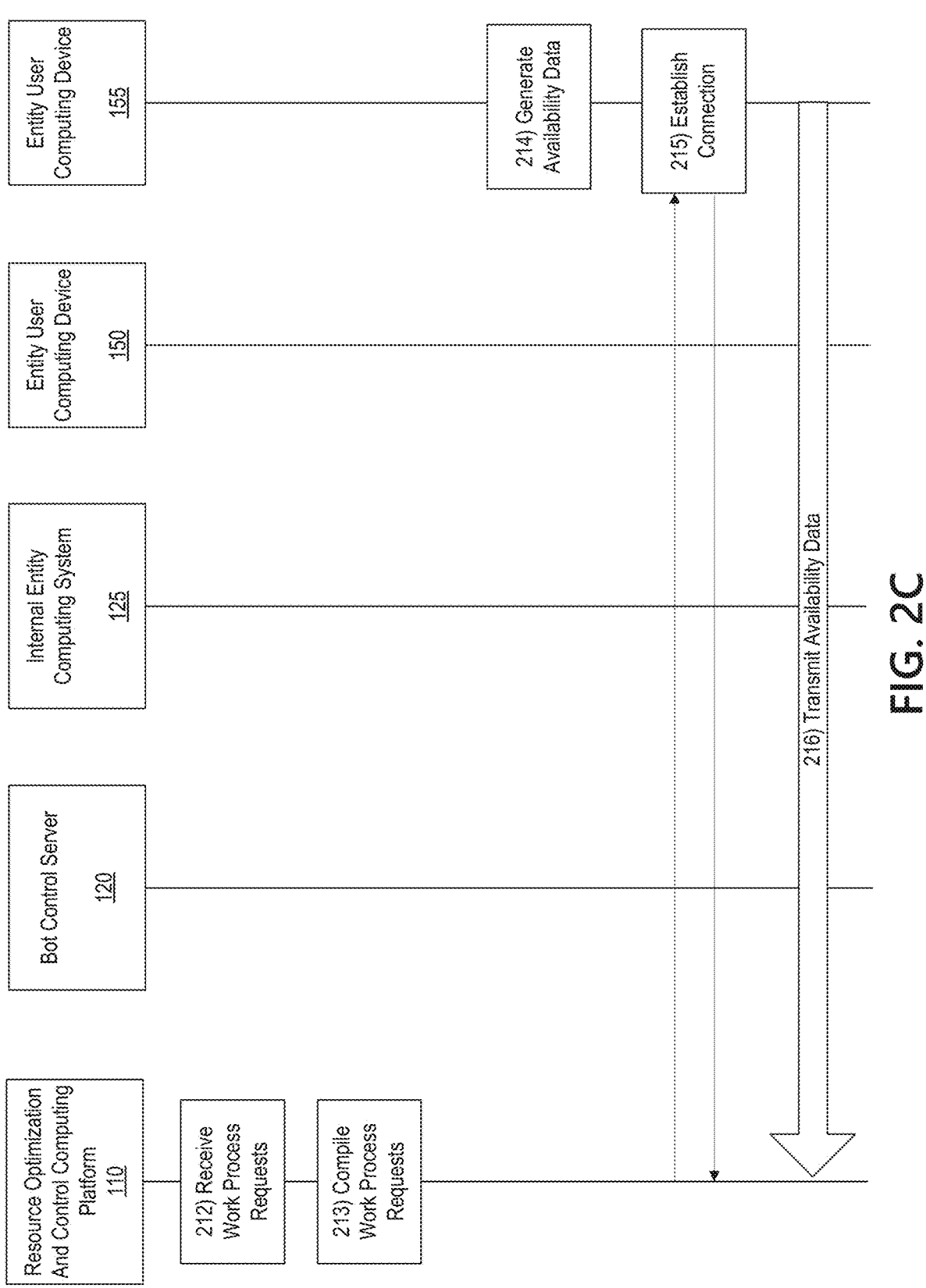

With reference to FIG. 2C, at step 212, the resource optimization and control computing platform 110 may receive the work process request(s) from entity user computing device 150.

At step 213, the received work process requests may be compiled or aggregated with other work process requests received from one or more other entity user computing devices, external entity user computing devices, or the like. In some examples, the compiled or aggregated work process requests may constitute a book of work representing current (in some cases all current) work processes requested (e.g., in real-time or near real-time).

At step 214, availability data may be generated by one or more entity user computing devices, such as entity user computing device 155. For instance, entity user computing device 155 may be associated with a human user or resource operator that processes work process requests. Accordingly, real-time availability data associated with entity user computing device 155 may indicate an availability of the user to handle current or incoming requests for work processes. In some examples, availability data may be based on activity logs, cursor movement, and the like, associated with entity user computing device 155.

At step 215, a connection may be established between the entity user computing device 155 and resource optimization and control computing platform 110. For instance, a third wireless connection may be established between the resource optimization and control computing platform 110 and entity user computing device 155. Upon establishing the third wireless connection, a communication session may be initiated between resource optimization and control computing platform 110 and entity user computing device 155.

At step 216, the generated availability data may be transmitted to the resource optimization and control computing platform 110. For instance, entity user computing device 155 may transmit the availability data during the communication session establishing upon initiating the third wireless connection.

Figure 2D:
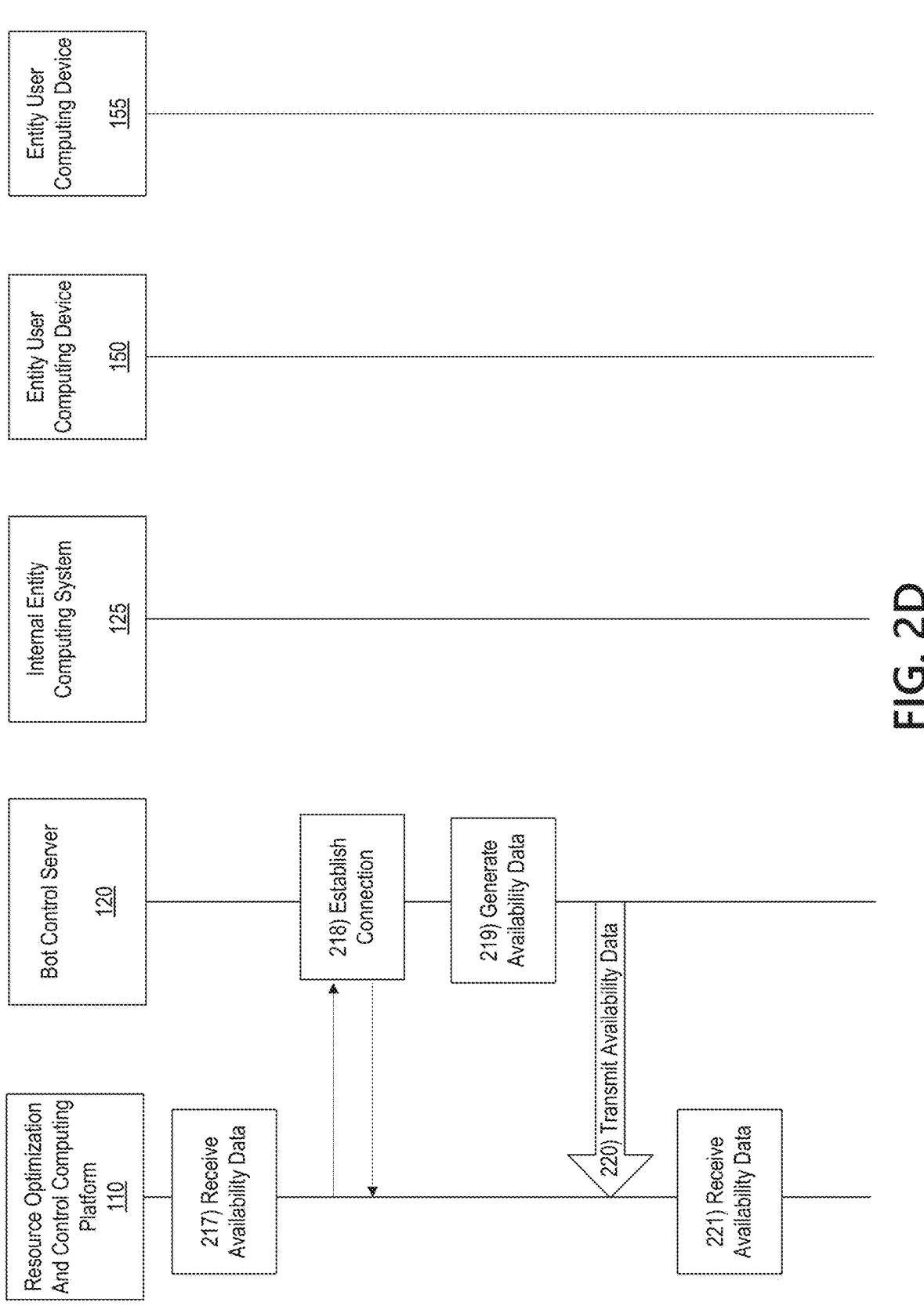

With reference to FIG. 2D, at step 217, the availability data may be received by resource optimization and control computing platform 110. Although FIG. 2D illustrates availability data being received from one entity user computing device 155, resource optimization and control computing platform 110 may receive availability data from a plurality of entity user computing devices on a real-time or near real-time basis, on a period or scheduled basis, or the like.

At step 218, a connection may be established between the bot control server 120 and resource optimization and control computing platform 110. For instance, a fourth wireless connection may be established between the resource optimization and control computing platform 110 and bot control server 120. Upon establishing the fourth wireless connection, a communication session may be initiated between resource optimization and control computing platform 110 and bot control server 120.

At step 219, availability data associated with one or more bots (e.g., RPA bots, RDA bots) may be generated. In some examples, the availability data may be generated in real-time or near real-time or transmitted continuously. Additionally or alternatively, bot availability data may be generated a predetermined or scheduled basis.

At step 220, the bot control server 120 may transmit the bot availability data to the resource optimization and control computing platform 110. For instance, bot control server may transmit the availability data during the communication session initiated upon establishing the fourth wireless connection.

At step 221, the resource optimization and control computing platform 110 may receive the bot availability data.

Figure 2E:
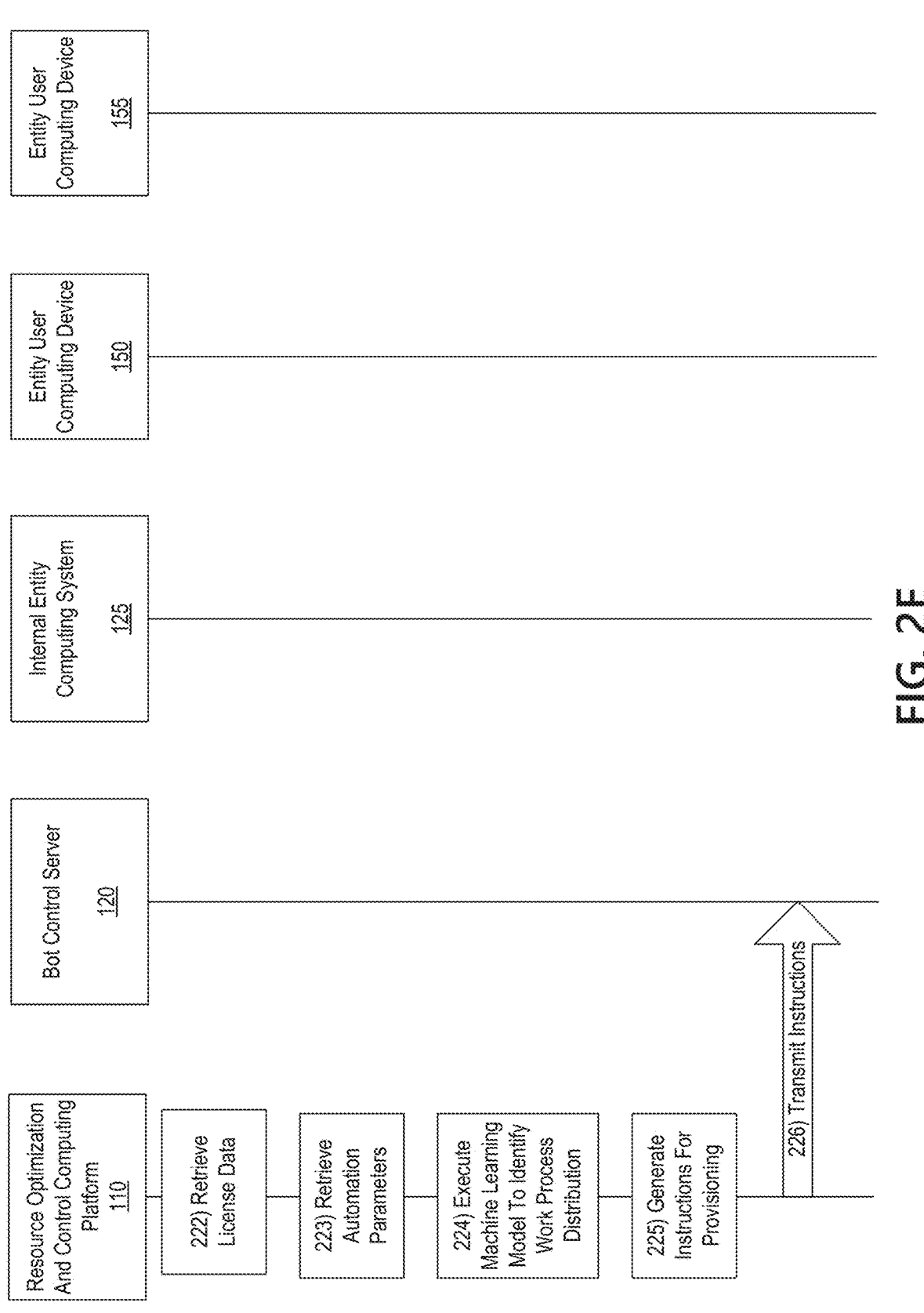

With reference to FIG. 2E, at step 222, license data may be retrieved or identified by resource optimization and control computing platform 110. For instance, license data may include a cost of a license for a particular bot, whether the license is paid based on usage, and the like. This information may be used by the machine learning model to identify appropriate resources, types of resources, and the like.

At step 223, any automation parameters may be retrieved. For instance, automation parameters particular to a line of business, work process or the like, may be identified. In some examples, a group or line of business may prefer heavy automation. Accordingly, automation may be set at 70% as a desired value and the machine learning model may use this input in determining a number and type of bots to identify for use.

Alternatively, automation parameters may be set lower (e.g., 25%, 30% or the like) and the machine learning model may then identify more human resources to make up a shortfall of automated resources.

At step 224, the one or more machine learning models may be executed. For instance, one or more machine learning models may receive, as inputs, the current book of work (e.g., compiled work process requests), license data, human availability data, bot availability data, and the like, and may determine a number and type of resources needed to process the requested work processes in the book of work. For instance, if the current book of work includes many work processes that are exceptions, more human resources may be needed and identified. Alternatively, if the current book of work includes mostly processes that can be handled by an RPA bot, more RPA bots may be identified as needed. As discussed, the machine learning model may consider factors such as availability, cost (e.g., for license, for human operator, and the like) to generate an optimal number and type of resources needed to process the book of work.

At step 225, one or more instructions or commands for provisioning the type and number of bots identified may be generated. For instance, provisioning parameters, instruction for requesting necessary credentials, and the like, may be generated in the instructions.

At step 226, the generated instructions or commands may be transmitted by the resource optimization and control computing platform 110 to the bot control server 120.

Figure 2F:
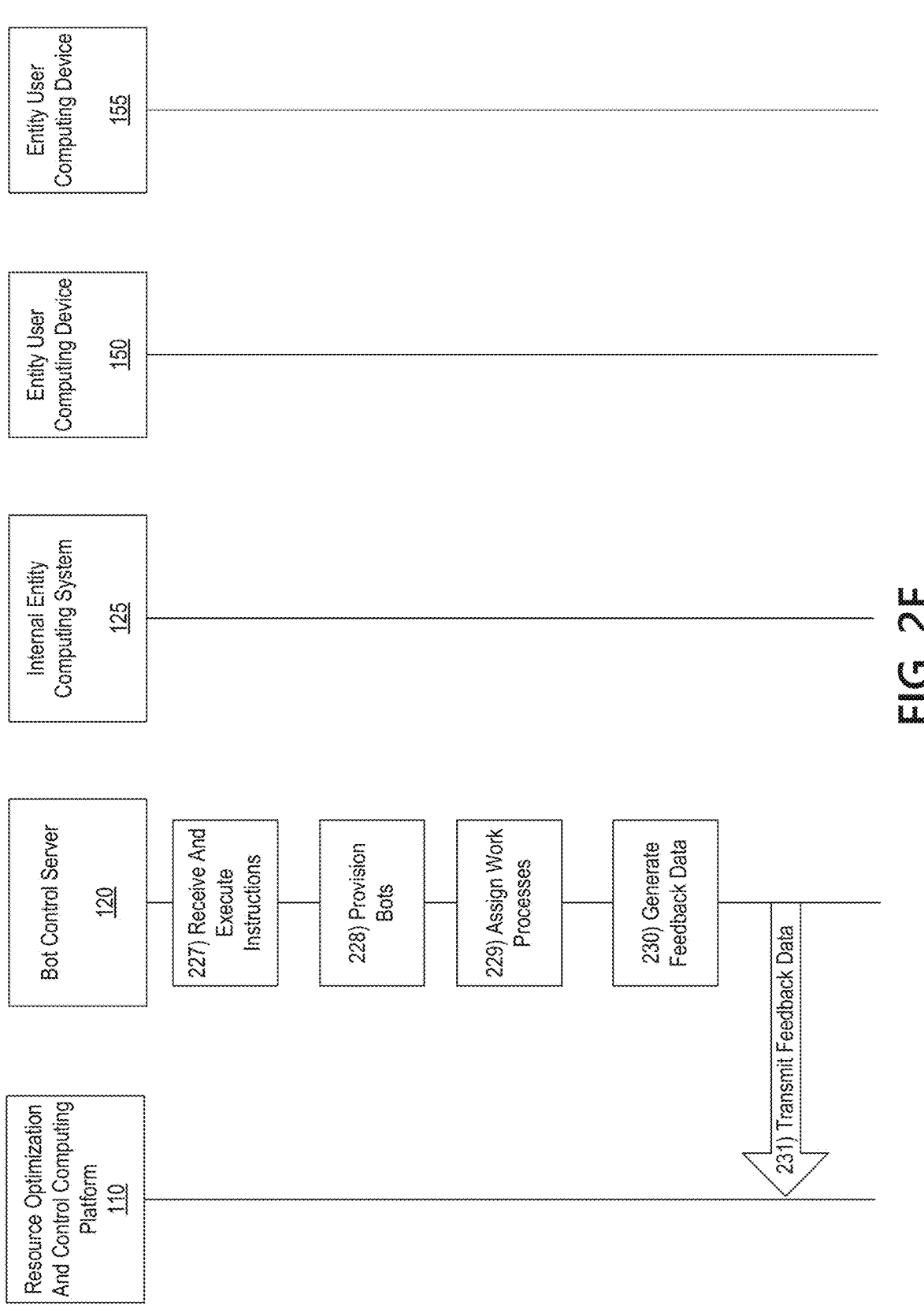

With reference to FIG. 2F, at step 227, the bot control server may receive and execute the instructions or commands from the resource optimization and control computing platform 110.

Based on the instructions, at step 228, a desired or requested number and/or type of bots may be provisioned for processing the work processes in the book of work. In some examples, provisioning the bots may include requesting credentials or other privileges enabling the bots to perform the desired functions. In some examples, privileges or credentials may vary between different lines of business or the like. Accordingly, privileges or credentials may be requested based on the work processes being assigned.

At step 229, work processes may be assigned to one or more bots or types of bots.

At step 230, feedback data may be generated by the one or more bots assigned the work processes. For instance, time to process each work process, successful completion data, and the like, may be generated as feedback data and, at step 231, may be transmitted to the resource optimization and control computing platform 110.

Figure 2G:
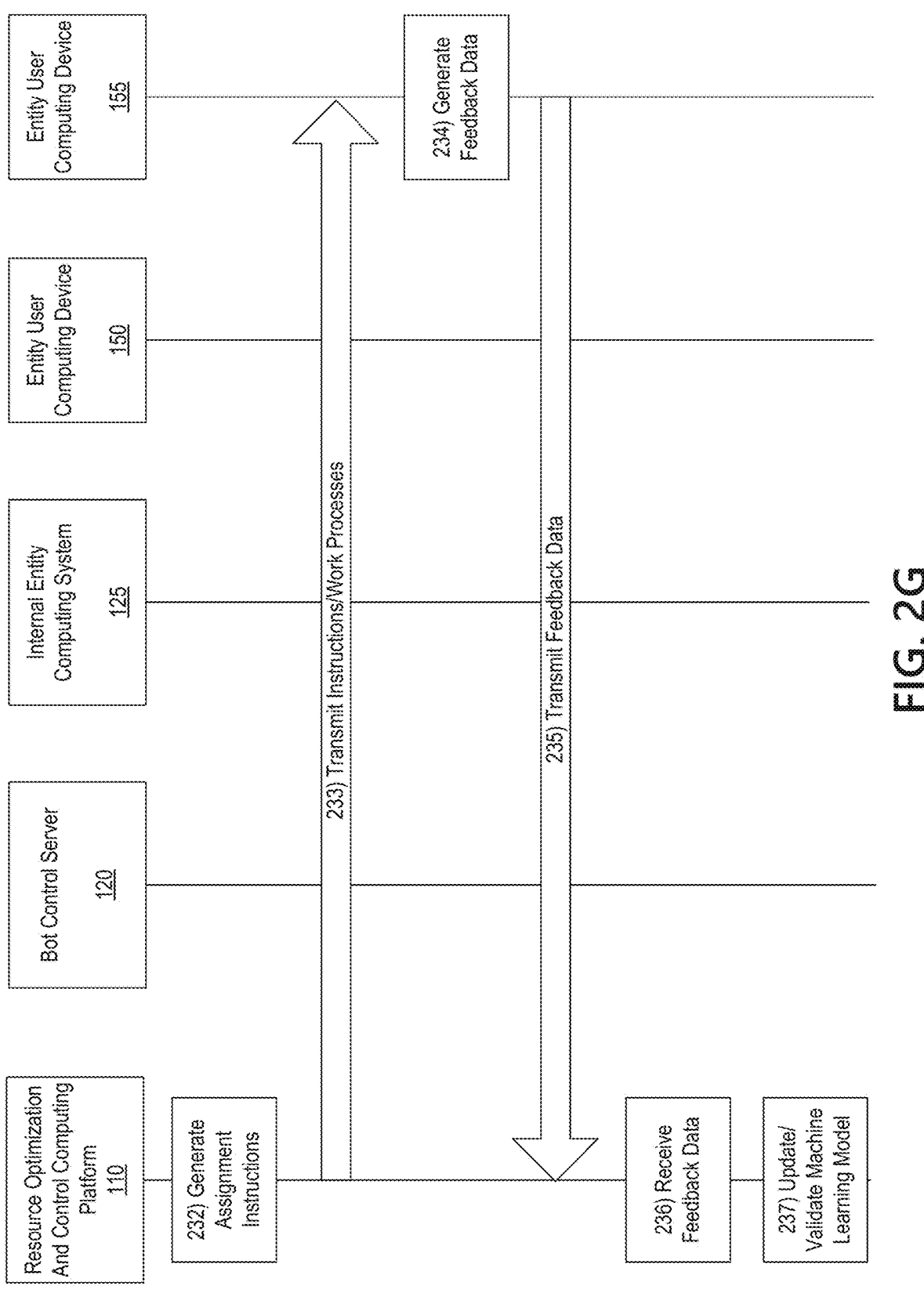

With reference to FIG. 2G, at step 232, assignment instructions for one or more human operators and/or human operators addressing work process with an RDA bot in a hybrid arrangement may be generated. In some examples, the assignment instructions may include particular work processes of the book of work to be processes by the human user associated with a computing device, such as entity user computing device 155.

At step 233, the assignment instructions and/or work processes may be transmitted by the resource optimization and control computing platform 110 to the entity user computing device 155.

At step 234, feedback data may be generated by the entity user computing device 155. For instance, data such as time to process a type of work process, completion rate, and the like, may be generated and, at step 235, transmitted to the resource optimization and control computing platform 110 as feedback data.

At step 236, the feedback data may be received by the resource optimization and control computing platform 110.

At step 237, feedback data received from the bot control server and one or more entity user computing devices 155 may be used to update and/or validate one or more machine learning models. Accordingly, the machine learning model (s) may be continuously update to improve accuracy of predictions.

Figure 4:
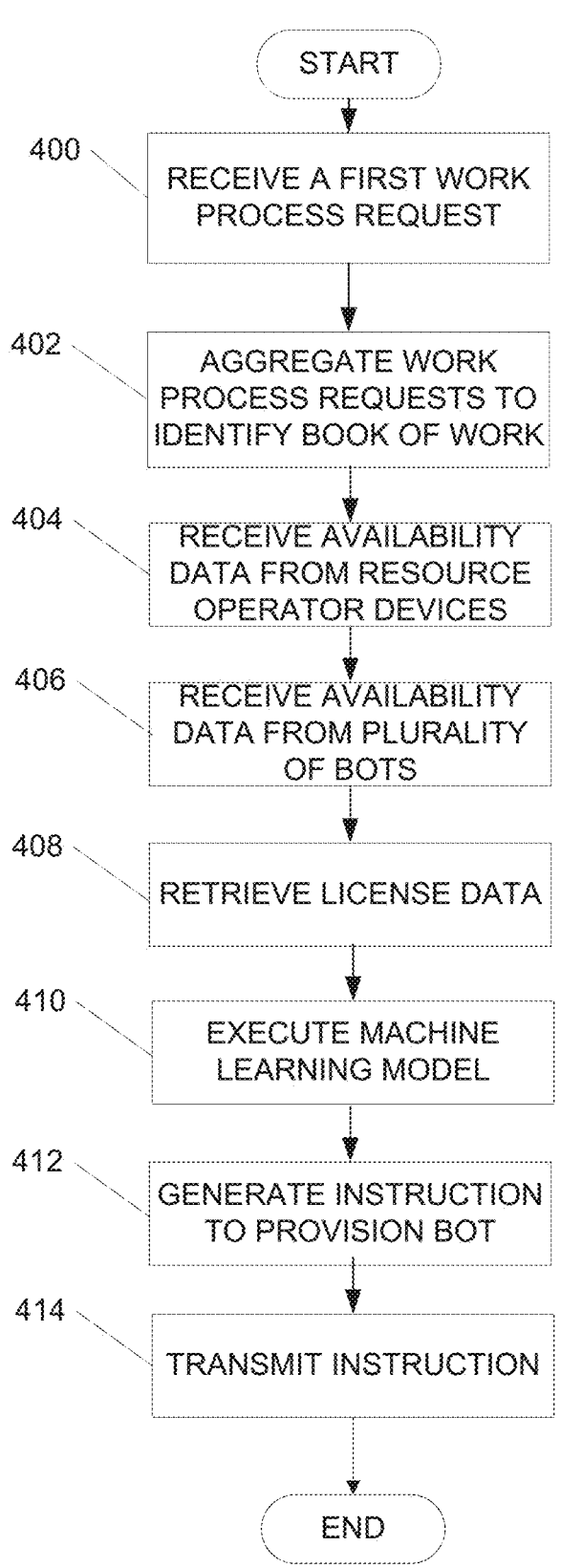
FIG. 4 illustrates an illustrative method for implementing resource optimization and control functions according to one or more aspects described herein.

FIG. 4 is a flow chart illustrating one example method of performing resource optimization and control functions according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a work process request may be received. For instance, a work process request may be received from one or more computing devices. The work process requests may include requests for service (e.g., a loan application, customer service request), a work process associated with one or more functions of a group or line of business within an enterprise organization, and the like.

At step 402, the received work process request may be aggregated or compiled with other work process requests to identify a current book of work. For instance, work process requests may be aggregated in real-time to identify a current or real-time book of working including work processes to be handled.

At step 404, availability data may be received from one or more resource operator computing devices associated with a human operator. In some examples, the availability data from the one or more resource operator computing devices (e.g., entity user computing device 155) may include activity logs, cursor movement data, and the like.

At step 406, availability data may be received from a plurality of bots. For instance, availability data from one or more bots (e.g., RPA bots, RDA bots) may be received from, for example, a bot control server 120.

At step 408, license data associated with the bots may be received. For instance, data associated with a cost of license, whether the bot is licensed based on usage, and the like, may be retrieved.

At step 410, a machine learning model may be executed to determined a number and type of resources needed to address the work processes in the book of work. In some examples, the bot availability data, resource operator availability data, license data and book of work may be used as inputs into the machine learning model to determine the desired number and type of resources.

At step 412, one or more instructions to provision one or more bots may be generated. In some examples, the instruction to provision the one or more bots may include an instruction to request privileges or credentials particular to a line of business in which the bot will be operating. In some examples, the instruction to provision one or more bots may include instructions to provision a subset of the plurality of bots.

At step 414, the generated one or more instructions may be transmitted to the bot control server for execution, provisioning of bots, and the like.

As discussed herein, aspects described are directed to using machine learning to determine an optimal number of resources to process a current book of work and dynamically provision the identified resources. The arrangements described use machine learning to aid in capacity management by identifying future or current needs and capacity of a hybrid workforce. The arrangements described provide flexible options for operational capacity fulfillment based on trends but may tune capacity requirements using machine learning based on current or real-time work processes or book of work needs.

Further, the arrangements described herein use granular data, such as data related to processes and subprocesses within a group or line of business, to determine baseline needs and resources. Accordingly, the identified number and type of resources may be customized to the line of business. Further the arrangements are scalable to handle any number of work process requests, resources available, and the like.

In addition, the arrangements discussed herein may enable efficient operation of the hybrid workforce. By inputting bot license data to the machine learning engine, costs associated with bot operation may be considered when identifying best fit resources. In addition, availability of bots for which licenses have been paid but are currently idle may be quickly identified and the bots may be provisioned to process requests in order to maximize bot processing efficiency.

Figure 5:
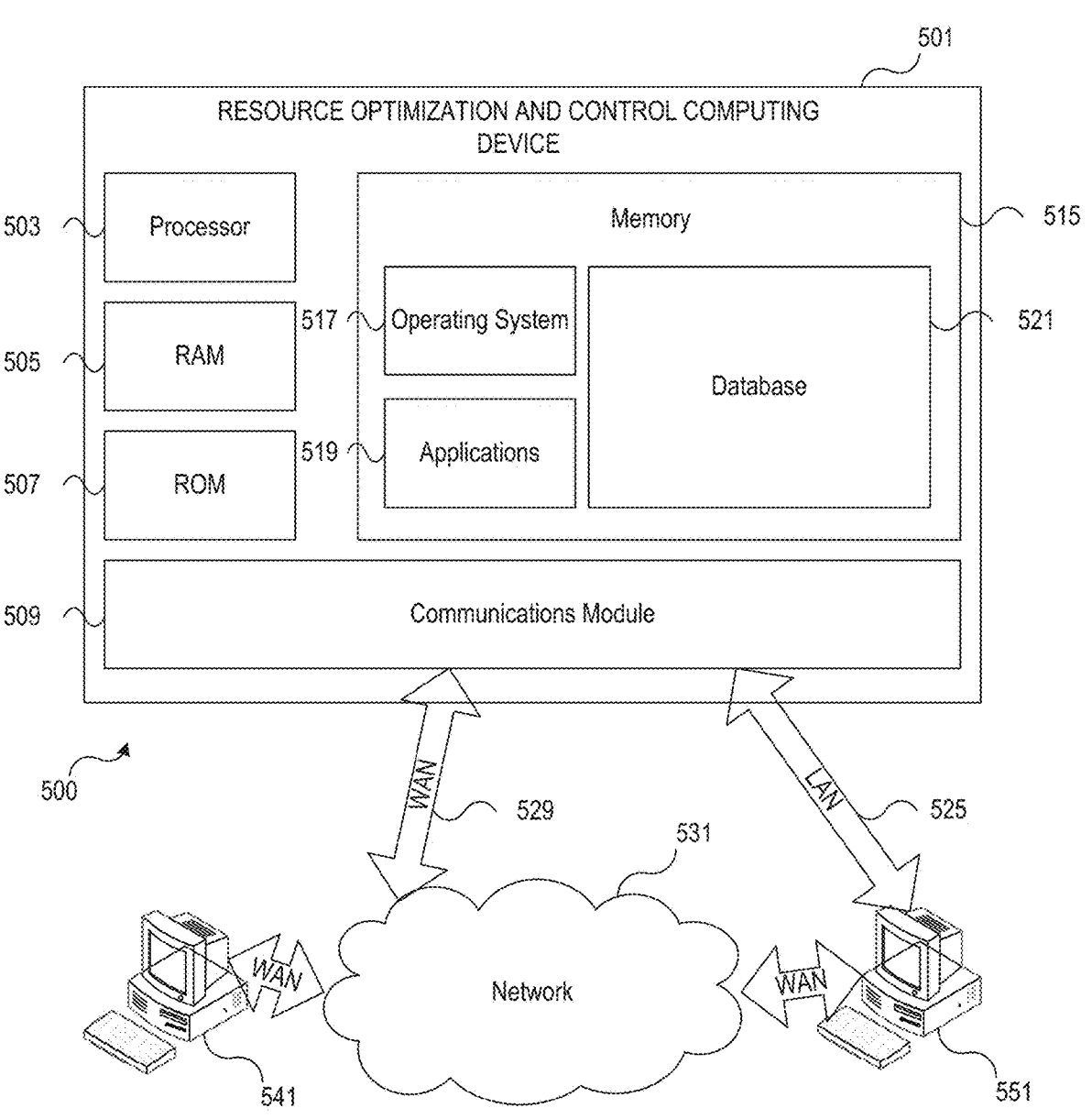
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include resource optimization and control computing device 501 having processor 503 for controlling overall operation of resource optimization and control computing device 501 and its associated components, including Random Access Memory (RAM) 505, Read-Only Memory (ROM) 507, communications module 509, and memory 515. Resource optimization and control computing device 501 may include a variety of computer readable media. Computer readable media may be any available media that may be accessed by resource optimization and control computing device 501, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by resource optimization and control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on resource optimization and control computing device 501. Such a processor may execute computer-executable instructions stored on a computer-readable medium.

Software may be stored within memory 515 and/or storage to provide instructions to processor 503 for enabling resource optimization and control computing device 501 to perform various functions as discussed herein. For example, memory 515 may store software used by resource optimization and control computing device 501, such as operating system 517, application programs 519, and associated database 521. Also, some or all of the computer executable instructions for resource optimization and control computing device 501 may be embodied in hardware or firmware. Although not shown, RAM 505 may include one or more applications representing the application data stored in RAM 505 while resource optimization and control computing device 501 is on and corresponding software applications (e.g., software tasks) are running on resource optimization and control computing device 501.

Communications module 509 may include a microphone, keypad, touch screen, and/or stylus through which a user of resource optimization and control computing device 501 may provide input, and may also include one or more of a speaker for providing audio output and a video display device for providing textual, audiovisual and/or graphical output. Computing system environment 500 may also include optical scanners (not shown).

Resource optimization and control computing device 501 may operate in a networked environment supporting connections to one or more remote computing devices, such as computing devices 541 and 551. Computing devices 541 and 551 may be personal computing devices or servers that include any or all of the elements described above relative to resource optimization and control computing device 501.

The network connections depicted in FIG. 5 may include Local Area Network (LAN) 525 and Wide Area Network (WAN) 529, as well as other networks. When used in a LAN networking environment, resource optimization and control computing device 501 may be connected to LAN 525 through a network interface or adapter in communications module 509. When used in a WAN networking environment, resource optimization and control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   train, based on historical data including a plurality of work processes, a type of resource that handled each work process and a time for a corresponding type of resource to handle the work process, a machine learning model to identify a workforce to handle work process requests, wherein the workforce includes a plurality of types of resources including at least one robotic process automation (RPA) bot and at least one remote desktop automation (RDA) bot, and wherein training the machine learning model includes identifying patterns or sequences in the historical data to identify one or more types of resources to handle the work process requests;
   receive a first work process request from a first computing device;
   aggregate the first work process request with other received work process requests, wherein the other received work process requests are received from other computing devices to identify a current book of work;

receive availability data associated with a plurality of RPA bots;

receive availability data associated with a plurality of RDA bots;

retrieve license data associated with the plurality of RPA bots and the plurality of RDA bots, wherein the license data includes whether a license was paid for each bot of the plurality of RPA bots and the plurality of RDA bots;

execute the machine learning model to control and tune capacity management by determining a number and type of resources needed to process the book of work, the machine learning model using as inputs at least the book of work, the availability data associated with the plurality of RPA, the availability data associated with the plurality of RDA bots, and the license data to output a number of RPA bots and a number of RDA bots to perform the first work process requested;

generate an instruction to provision a first subset of the plurality of RPA bots based on the determined number and type of resource needed to process the book of work, wherein the first subset includes the number of RPA bots output by the machine learning model and wherein provisioning the first subset of the plurality of RPA bots includes enabling the first subset of RPA bots to perform the first work process request;

generate an instruction to provision a second subset of the plurality of RDA bots based on the determined number and type of resource needed to process the book of work, wherein the second subset includes the number of RDA bots output by the machine learning model and wherein provisioning the second subset of the plurality of RDA bots includes enabling the second subset of RDA bots to perform the first work process request;

transmit the instruction to provision the first subset and the instruction to provision the second subset to a bot control server for bot provisioning of the first subset of the plurality of RPA bots and the second subset of the plurality of RDA bots; and provision, based on the instruction, the first subset of the plurality of RPA bots and the second subset of the plurality of RDA bots.

2. The computing platform of claim 1, wherein bot provisioning includes requesting privileges to process one or more work processes from a line of business associated with the one or more work processes.

3. The computing platform of claim 1, wherein the availability data associated with at least one of: the plurality of RPA bots or the plurality of the RDA bots includes real-time availability data.

4. The computing platform of claim 1, wherein the machine learning model is further trained using the historical data to determine a baseline book of work and associated bot resources.

5. The computing platform of claim 1, the instructions further causing the computing platform to:

receive, from the bot control server, feedback data; and
update the machine learning model based on the feedback data.

6. The computing platform of claim 1, wherein provisioning the first subset of the plurality of RPA bots and the second subset of the plurality of RDA bots includes requesting credentials enabling bots of the first subset of the plurality of RPA bots and bots of the second subset of the plurality of RDA bots to perform desired functions.

7. A method, comprising:

training, by a computing platform, the computing platform having at least one processor and memory and based on historical data including a plurality of work processes, a type of resource that handled each work process and a time for a corresponding type of resource to handle the work process, a machine learning model to identify a workforce to handle work process requests, wherein the workforce includes a plurality of types of resources including at least one robotic process automation (RPA) bot, and at least one remote desktop automation (RDA) bot, and wherein training the machine learning model includes identifying patterns or sequences in the historical data to identify one or more types of resources to handle the work process requests;

receiving, by the at least one processor, a first work process request from a first computing device;

aggregating, by the computing platform, the first work process request with other received work process requests, wherein the other received work process requests are received from other computing devices to identify a current book of work;

receiving, by the computing platform, availability data associated with a plurality of RPA bots;

receiving, by the computing platform, availability data associated with a plurality of RDA bots;

retrieving, by the computing platform, license data associated with the plurality of RPA bots and the plurality of RDA bots, wherein the license data includes whether a license was paid for each bot of the plurality of RPA bots and the plurality of RDA bots;

executing, by the computing platform, the machine learning model to control and tune capacity management by determining a number and type of resources needed to process the book of work, the machine learning model using as inputs at least the book of work, the availability data associated with the plurality of the first type ofRPA bots, the availability data associated with the plurality of RDA bots and the license data to output a number of RPA bots and a number of RDA bots to perform the first work process requested;

generating, by the computing platform, an instruction to provision a first subset of the plurality of RPA bots based on the determined number and type of resource needed to process the book of work, wherein the first subset includes the number of RPA bots output by the machine learning model and wherein provisioning the first subset of the plurality of RPA bots includes enabling the first subset of RPA bots to perform the first work process request;

generate an instruction to provision a second subset of the plurality of RDA bots based on the determined number and type of resource needed to process the book of work, wherein the second subset includes the number of RDA bots output by the machine learning model and wherein provisioning the second subset of the plurality of RDA bots includes enabling the second subset of RDA bots to perform the first work process request;

transmitting, by the computing platform, the instruction to provision the first subset and the instruction to provision the second subset to a bot control server for bot provisioning of the first subset of the plurality of RPA bots and the second subset of the plurality of RDA bots; and provisioning, based on the instruction, the first subset of the plurality of RPA bots and the second subset of the plurality of RDA bots.

8. The method of claim 7, wherein the availability data associated with at least one of: the plurality of RPA bots or the plurality of RDA bots includes real-time availability data.

9. The method of claim 7, wherein the machine learning model is further trained using the historical data to determine a baseline book of work and associated bot resources.

10. The method of claim 7, further including:

receiving, by the computing platform and from the bot control server, feedback data; and updating, by the computing platform, the machine learning model based on the feedback data.

11. One or more non-transitory computer-readable media storing instructions that, when executed by a computing platform comprising at least one processor, memory, and a communication interface, cause the computing platform to:

train, based on historical data including a plurality of work processes, a type of resource that handled each work process and a time for a corresponding type of resource to handle the work process, a machine learning model to identify a workforce to handle work process requests, wherein the workforce includes a plurality of types of resources including at least one robotic process automation (RPA) bot and at least one remote desktop automation (RDA) bot, and wherein training the machine learning model includes identifying patterns or sequences in the historical data to identify one or more types of resources to handle the work process requests;

receive a first work process request from a first computing device;

aggregate the first work process request with other received work process requests, wherein the other received work process requests are received from other computing devices to identify a current book of work;

receive availability data associated with a plurality of RPA bots;

receive availability data associated with a plurality of RDA bots;

retrieve license data associated with the plurality of the RPA bots and the plurality of RDA bots, wherein the license data includes whether a license was paid for each bot of the plurality of RPA bots and the plurality of RDA bots;

execute the machine learning model to control and tune capacity management by determining a number and type of resources needed to process the book of work, the machine learning model using as inputs at least the book of work, the availability data associated with the plurality of RPA bots, the availability data associated with the plurality of RDA bots, and the license data to output a number of RPA bots and a number of RDA bots to perform the first work process requested;

generate an instruction to provision a first subset of the plurality of RPA bots based on the determined number and type of resource needed to process the book of work, wherein the first subset includes the number of RPA bots output by the machine learning model and wherein provisioning the first subset of the plurality of RPA bots includes enabling the first subset of RPA bots to perform the first work process request;

generate an instruction to provision a second subset of the plurality of RDA bots based on the determined number and type of resource needed to process the book of work, wherein the second subset includes the number of RDA bots output by the machine learning model and wherein provisioning the second subset of the plurality of RDA bots includes enabling the second subset of RDA bots to perform the first work process request;

transmit the instruction to provision the first subset and the instruction to provision the second subset to a bot control server for bot provisioning of the first subset of the plurality of RPA bots and the second subset of the plurality of RDA bots; and provision, based on the instruction, the first subset of the plurality of RPA bots and the second subset of the plurality of RDA bots.

12. The one or more non-transitory computer-readable media of claim 11, wherein bot provisioning includes requesting privileges to process one or more work processes from a line of business associated with the one or more work processes.

13. The one or more non-transitory computer-readable media of claim 11, wherein the availability data associated with at least one of: the plurality of RPA bots or the plurality of RDA bots includes real-time availability data.

14. The one or more non-transitory computer-readable media of claim 11, wherein the machine learning model is further trained using the historical data to determine a baseline book of work and associated bot resources.

15. The one or more non-transitory computer-readable media of claim 11, the instructions further causing the computing platform to:

receive, from the bot control server, feedback data; and update the machine learning model based on the feedback data.

* * * * *